United States Patent
Moons et al.

(10) Patent No.: US 10,779,669 B2
(45) Date of Patent: Sep. 22, 2020

(54) CHAIR MAT HAVING RUG ROLLING SURFACE

(71) Applicant: GFH Enterprises, Inc., St. Louis, MO (US)

(72) Inventors: David A. Moons, Olivette, MO (US); Tarik Chhabra, Panipat (IN)

(73) Assignee: GFH Enterprises, Inc., St. Louis, MO (US)

( * ) Notice: Subject to any disclaimer, the term of this patent is extended or adjusted under 35 U.S.C. 154(b) by 366 days.

(21) Appl. No.: 15/714,689

(22) Filed: Sep. 25, 2017

(65) Prior Publication Data

US 2019/0090676 A1 Mar. 28, 2019

(51) Int. Cl.
| | |
|---|---|
| *A47G 27/02* | (2006.01) |
| *B32B 5/02* | (2006.01) |
| *B32B 7/12* | (2006.01) |
| *B32B 21/08* | (2006.01) |
| *B32B 27/08* | (2006.01) |
| *B32B 27/30* | (2006.01) |
| *B32B 27/36* | (2006.01) |

(52) U.S. Cl.
CPC .......... *A47G 27/0206* (2013.01); *B32B 5/022* (2013.01); *B32B 5/024* (2013.01); *B32B 7/12* (2013.01); *B32B 21/08* (2013.01); *B32B 27/08* (2013.01); *B32B 27/304* (2013.01); *B32B 27/365* (2013.01); *B32B 2307/744* (2013.01); *B32B 2471/04* (2013.01)

(58) Field of Classification Search
CPC .... A47G 27/0206; B32B 5/022; B32B 5/024; B32B 7/12; B32B 21/08; B32B 27/08; B32B 27/304; B32B 27/365; B32B 2307/744; B32B 2471/04
See application file for complete search history.

(56) References Cited

U.S. PATENT DOCUMENTS 4,448,625 A * 5/1984 Carrera .................. B29C 66/71
                                                  156/243
5,073,428 A * 12/1991 Lancelot ............ A47G 27/0206
                                                  428/120

(Continued)

FOREIGN PATENT DOCUMENTS

CN          204181405 U   *   3/2015

OTHER PUBLICATIONS

"Laminated" definition by dictionary.com, http://www.dictionary.com/browse/laminated[Jun. 15, 2018 2:36:35 PM].*

(Continued)

*Primary Examiner* — Cheryl Juska
(74) *Attorney, Agent, or Firm* — Stinson LLP

(57) ABSTRACT

A chair mat has a top that is a rug or carpet so that the chair mat has the appearance of an area rug. A woven or knitted rug is attached to a mesh material that can carry the loads that are applied to the rug top to hold the rug top from stretching or bunching when casters of a wheeled chair move over the rug top. The chair mat has a rigid layer to which a woven or knitted rug is attached to provide a hard underlying surface over when the wheeled chair may more easily move. The chair mat may be hinged to permit the chair mat to be folded to a smaller configuration where it is more readily stored or transported.

24 Claims, 11 Drawing Sheets

(56) References Cited

U.S. PATENT DOCUMENTS

| | | | |
|---|---|---|---|
| 6,022,617 A * | 2/2000 | Calkins | A47G 23/032 |
| | | | 428/354 |
| 6,177,165 B1 * | 1/2001 | Robbins, III | A47G 27/0206 |
| | | | 248/346.01 |
| 7,361,616 B2 | 4/2008 | Gold | |
| 7,402,536 B2 | 7/2008 | Gold | |
| 8,075,971 B1 * | 12/2011 | Horian | B32B 3/08 |
| | | | 428/61 |
| 8,158,232 B2 | 4/2012 | Gold et al. | |
| 9,061,482 B2 | 6/2015 | Gold | |
| 2004/0253412 A1 * | 12/2004 | Dotson | A47G 27/0206 |
| | | | 428/119 |
| 2005/0129916 A1 * | 6/2005 | Grace-Moore | A47G 27/0206 |
| | | | 428/204 |
| 2011/0296801 A1 * | 12/2011 | Cheris | A47G 27/0206 |
| | | | 53/473 |
| 2014/0154474 A1 * | 6/2014 | Robbins, III | B29C 43/222 |
| | | | 428/167 |
| 2018/0161226 A1 * | 6/2018 | Von Behren | A61G 7/065 |

OTHER PUBLICATIONS

"Laminated" defintion by merriam-webster online dictionary, https://www.merriam-webster.com/dictionary/laminated[Jun. 15, 2018 2:42:00 PM].*

* cited by examiner

1

CHAIR MAT HAVING RUG ROLLING SURFACE

FIELD

The present disclosure generally relates to chair mats that are used to provide a surface for chairs having wheels to roll across.

BACKGROUND

Roller chairs are used in offices and homes to provide a seat that allows the use to move from place to place, typically in a work area, to perform tasks. Roller chairs usually have casters that roll well over flooring that is hard and relatively smooth. When placed on rugs or carpets, the casters either will not roll at all or only with very great difficulty. In the case of an area rug, the rug tends to bunch up when the roller chair moves over the rug. This inhibits movement of the roller chair and causes the rug not to lie flat on the floor. Chair mats having a hard and smooth rolling surface are often acquired to place over rugs or carpets to allow the chair to roll easily. Even on hard surfaces such as hardwood floors, the casters may roll easily, but may scuff and damage the floor, which is undesirable. Chair mats are frequently used to protect hard flooring from wear caused by the casters rolling over the flooring. Chair mats are often made of a hard, usually clear plastic. Some chair mats can also be made from hardwoods that have a more aesthetically pleasing appearance than plastic.

SUMMARY

In one aspect of the present invention, a chair mat providing a rolling surface for a wheeled chair comprises a rigid layer having an upper surface and a lower surface and including at least two rigid layer members arranged for folding one onto the other about a hinge. A strength layer attached to the rigid layer holds the rigid layer members together for folding about the hinge. A fabric floor covering fixedly attached to the upper surface of the rigid layer and to the strength layer.

In another aspect of the present invention, chair mat providing a rolling surface for a wheeled chair comprises a rug layer formed by one of weaving and knitting and being free of a pile or nap. A strength layer intimately bonded to the rug layer has a greater resistance to plastic deformation than the rug layer. A rigid layer attached to the rug and strength layers is harder than the rug layer and the strength layer and has a greater resistance to bending than the rug layer and the strength layer.

Other objects and features of the present invention will be in part apparent and in part pointed out thereinafter.

BRIEF DESCRIPTION OF THE DRAWINGS

Corresponding reference characters indicate corresponding parts throughout the several views of the drawings.

DETAILED DESCRIPTION

Figure 1:
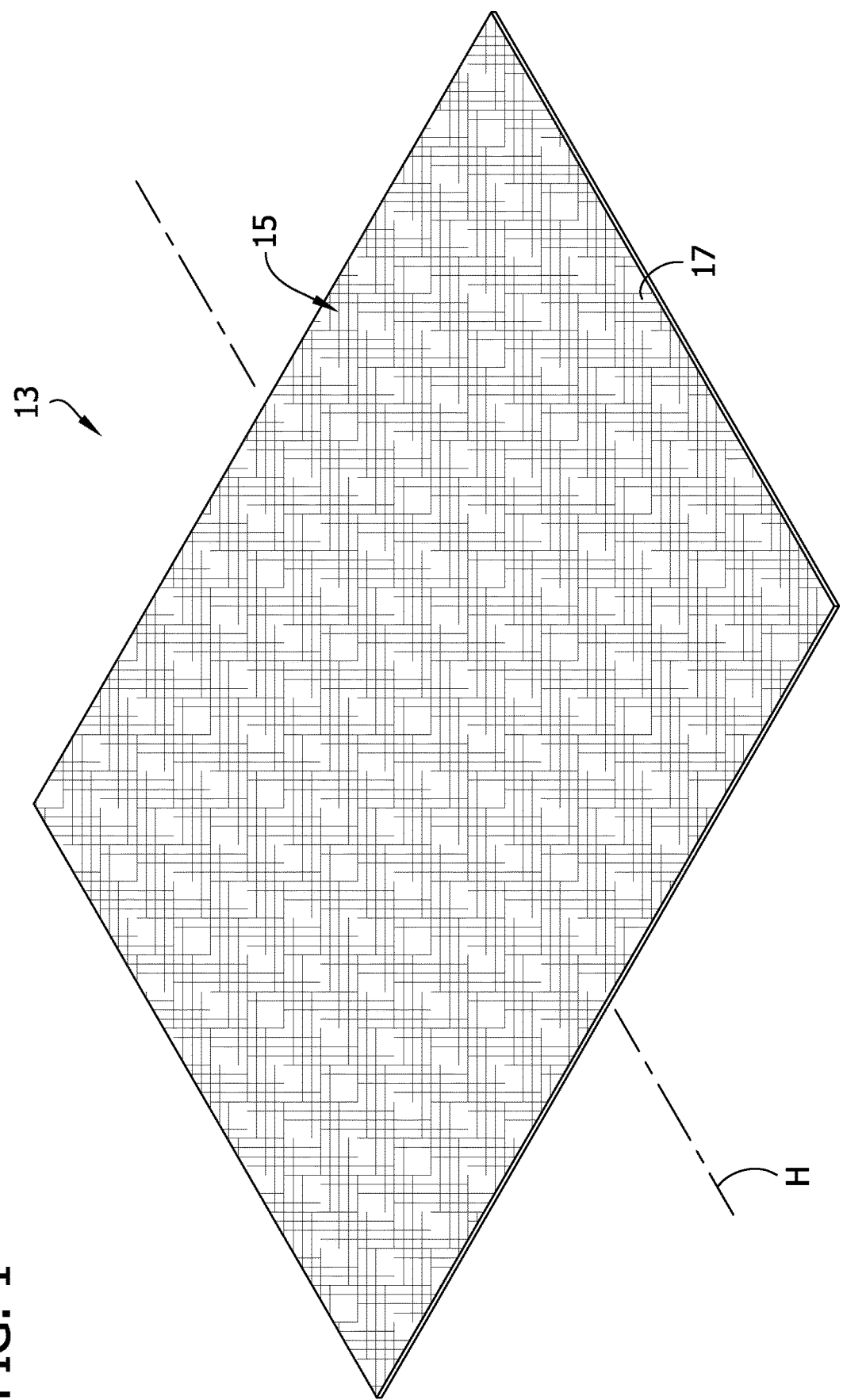
FIG. 1 is a top side perspective of a chair mat laid open and flat.
Figure 2:
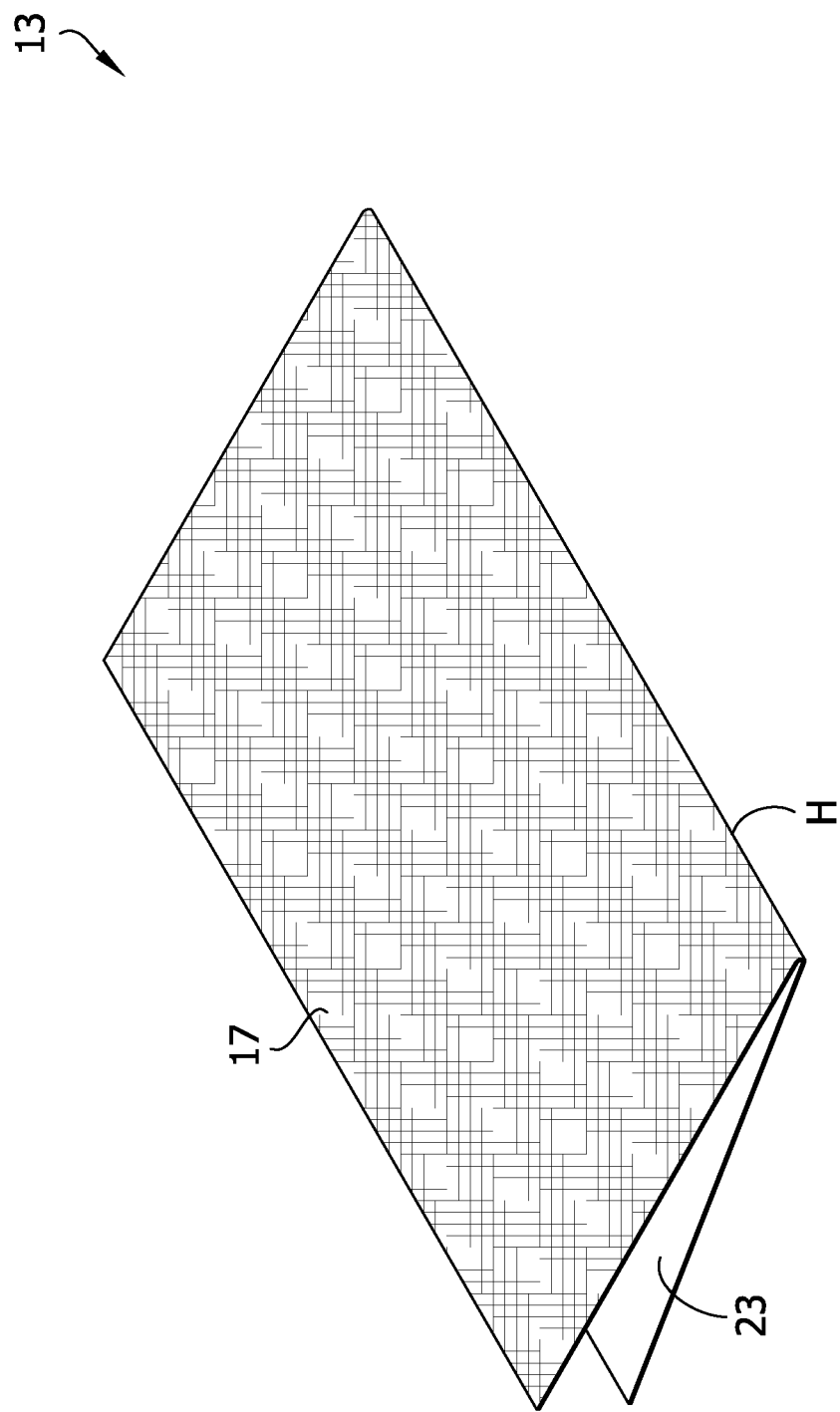
FIG. 2 is a perspective of the chair mat in a folded configuration.
Figure 3:
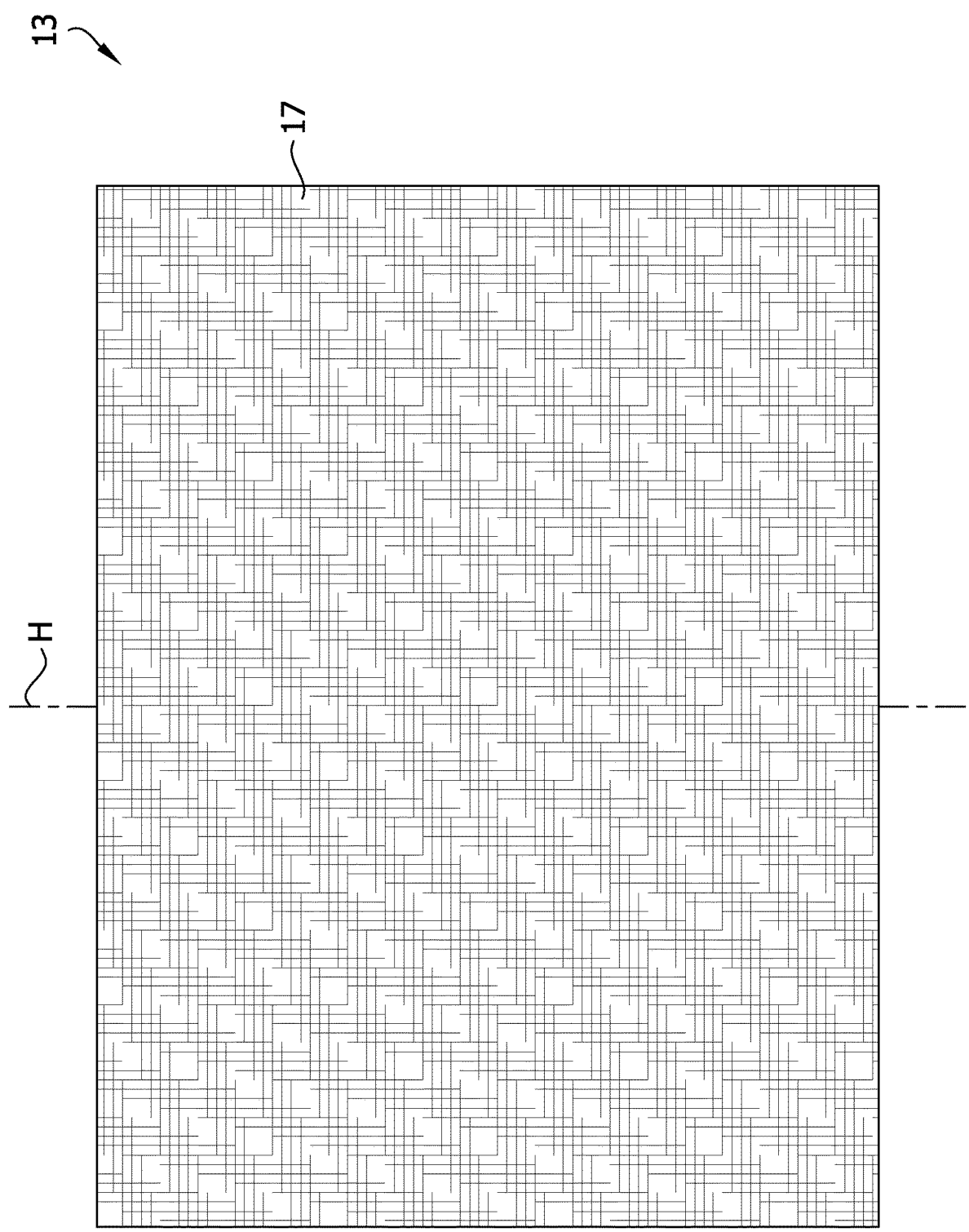
FIG. 3 is a top plan view of the chair mat laid open and flat.
Figure 4:
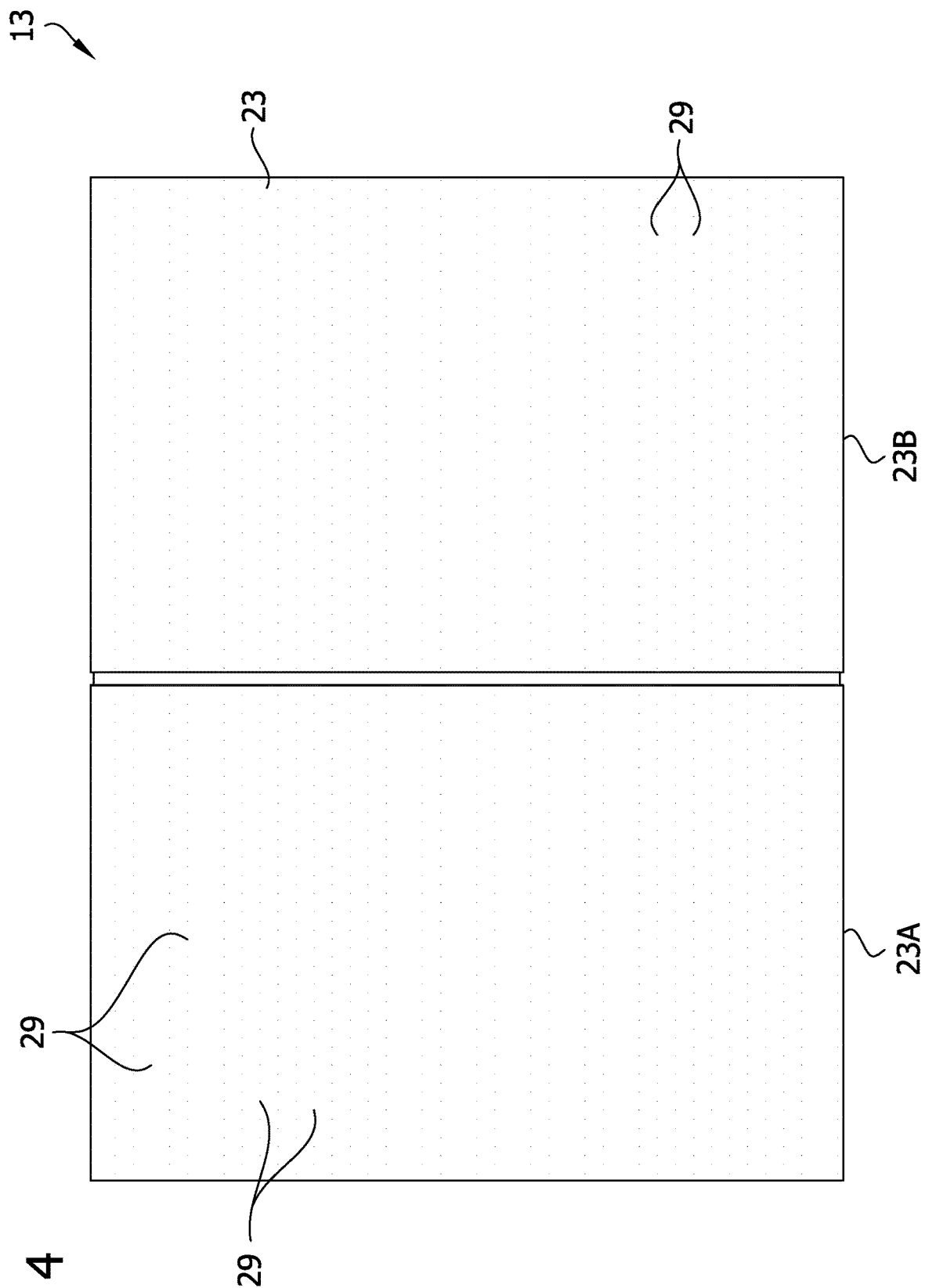
FIG. 4 is a bottom plan view of the chair mat of FIG. 3.

Referring now to the drawings and in particular to FIGS. 1 and 2, a chair mat constructed according to the principles of the present invention is indicated generally at 13. In use, the chair mat 13 is open and laid flat as shown in FIG. 1. An upper surface generally indicated at 15 is formed by a carpet or rug 17 (broadly, a fabric floor covering), and is constructed to permit a wheeled chair (e.g., a chair having casters, not shown) to roll across the upper surface with minimal resistance to rolling. In this way a person sitting in the wheeled chair at, for example, a desk may move around to access different items in the work area by simply rolling the wheeled chair across the upper surface 15 of the chair mat 13 to the desired location. The person may be at a desk for using a computer and may move to a second area where papers are reviewed, and then to a third area to access a file cabinet. It will be readily understood that there are many other instances and contexts not described in this description in which it is more efficient to roll in the wheeled chair to different locations. The chair mat 13 is useful to provide the upper (rolling) surface 15 when the floor underlying the chair mat is not conducive to rolling. For example, the floor may be covered by carpet which is highly resistant to rolling by the wheeled chair. Even if the floor provides a hard and smooth surface suitable for rolling the wheeled chair across, the chair mat 13 can protect the underlying floor from marking and scuffing that can be caused by moving the chair across the floor. As shown in FIG. 2, the chair mat can be folded in two about a hinge H for storing or transporting in a more compact form. The hinged construction will be described more fully hereinafter. It will be understood that the number of hinges may be other that one within the scope of the present invention. It is also envisioned that there may be no hinge so that the chair mat (not shown) is not capable of being folded.

The rug 17 of the chair mat 13 can have any design visible on its upper surface 15 that can be made on an area rug. As a result, the chair mat 13 can appear to be an area rug that permits chair mats to provide aesthetic enhancement to an area in which they are used. In the illustrated embodiment, rug 17 has a flatweave or knitted construction. Preferably, the rug 17 has no pile or nap. Typically a pile or nap is made of loops of yarn connected to the underlying weave or knitted backing. More specifically, the rug 17 is Jacquard woven and made from suitable materials including synthetic materials. For example, in one embodiment, the rug includes yarns in the warp direction made of polyester, yarns in the weft direction made of 60% recycled polyethylene terephthalate (PET) and 40% acrylic, and has a weight of about 450 g/m². Other suitable materials, without limitation, include polypropylene, nylon, olefins, and polyimides. Various combination and blends of synthetic materials may be used. Materials of the type described have high wear resistance suitable for the casters of the wheeled chair, and can be dyed or printed so as to produce any selected design on the upper surface 15 of the rug 17.

Figure 5:
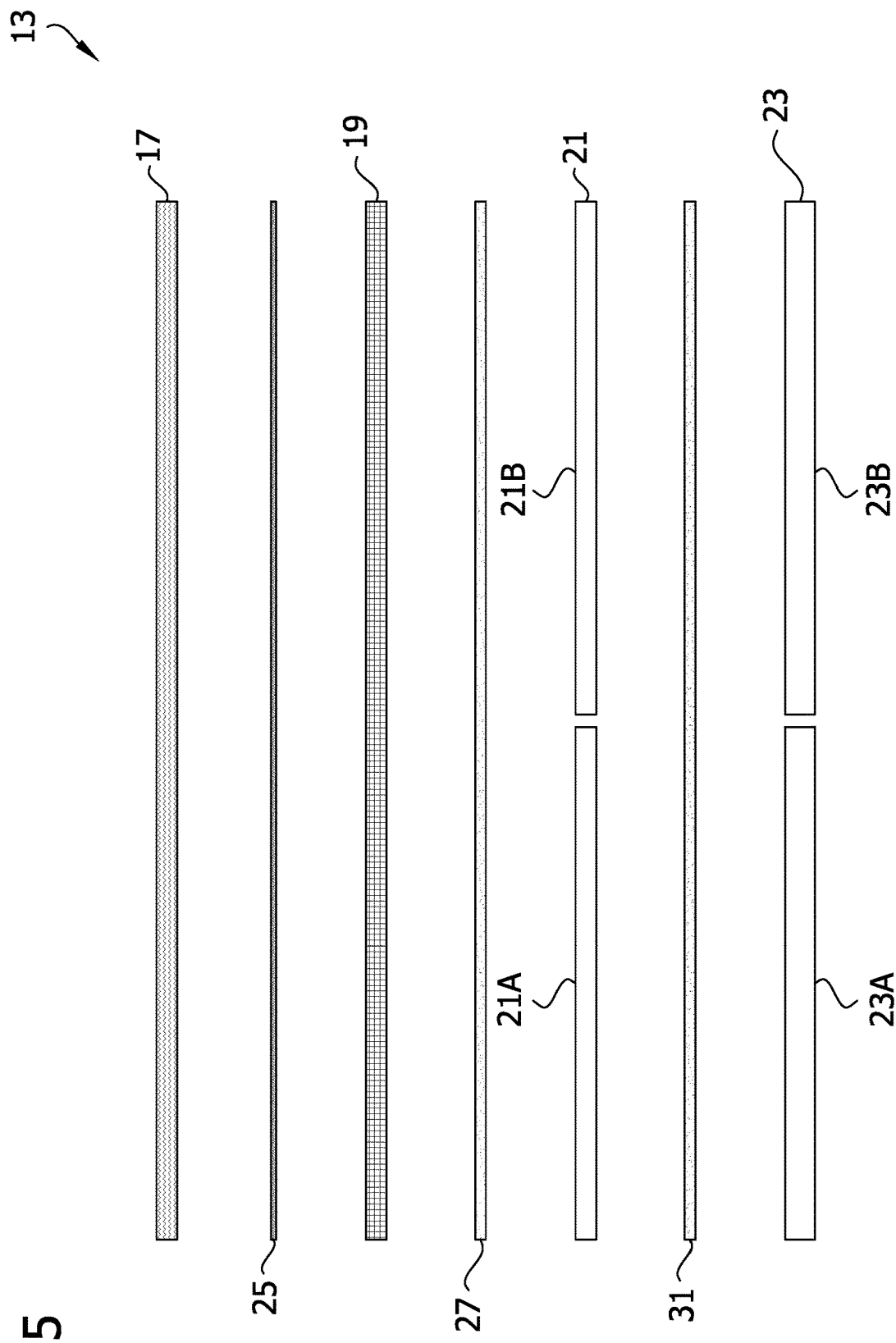
FIG. 5 is a schematic exploded side view of the chair mat showing constituent layers of the chair mat.
Figure 6:
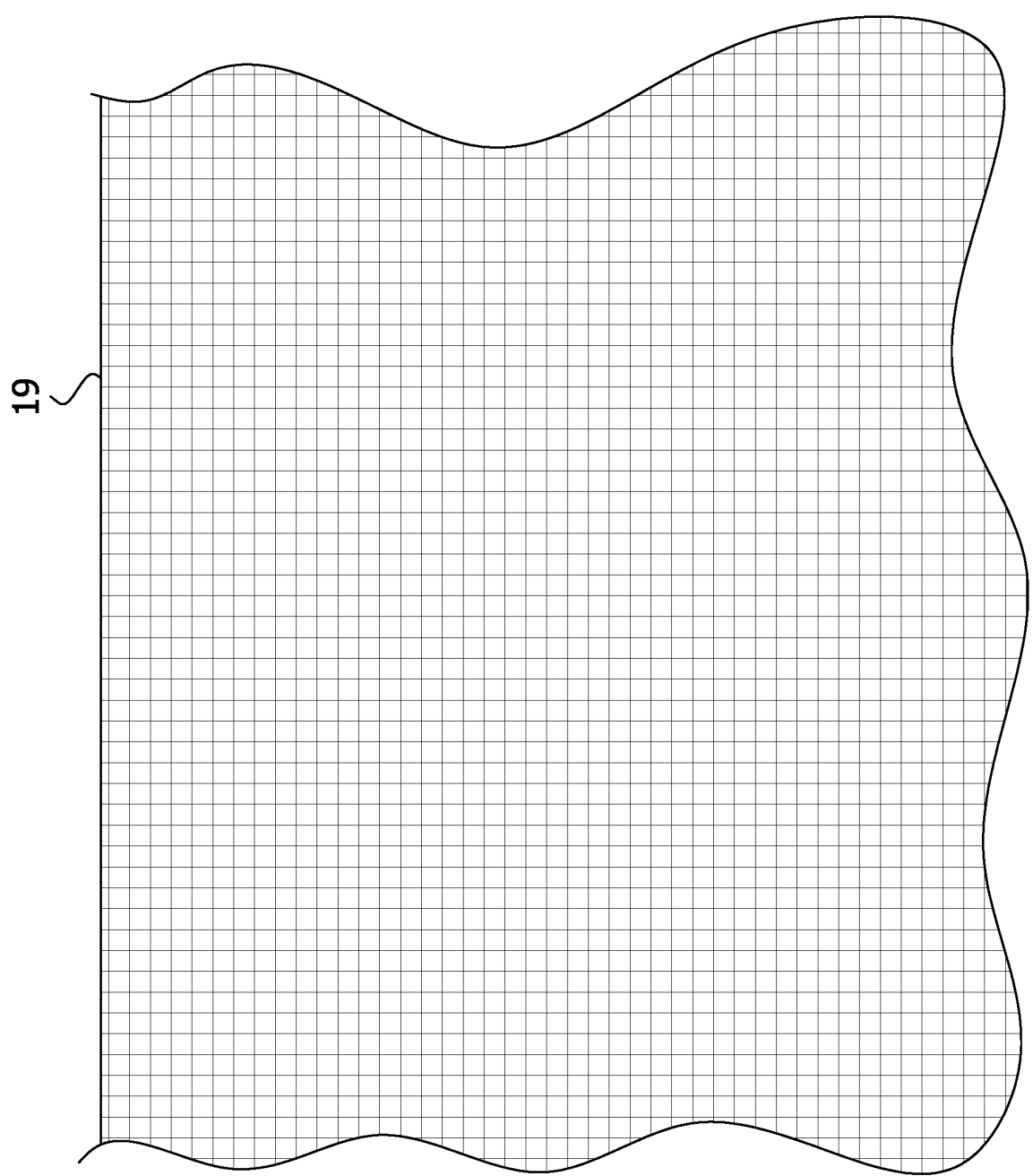
FIG. 6 is an enlarged fragmentary plan view of mesh material forming one of the constituent layers of the chair mat.

Referring now to FIG. 5, it may be seen that the chair mat 13 of the illustrated embodiment is a laminate construction made up of the rug layer 17, a strength layer 19, a rigid layer 21 and an anti-skid layer 23. The strength layer 19 comprises in the illustrated embodiment a polyester, warp knitted mesh fabric, an enlarged fragment of which is shown in FIG. 6. In one embodiment, the strength layer 19 is made of 100% polyester. In that embodiment, the weight of the strength layer 19 is about 110 g/m². The strength layer 19 is intimately bonded to the rug layer 17 in a suitable manner such as by a hot melt film layer 25 located between the rug layer 17 and the strength layer 19. The hot melt film layer 25 is in one embodiment ethylene vinyl acetate copolymer applied as a lamina of suitable thickness (e.g., 25 microns). The rug layer 17, strength layer 19 and hot melt file layer 25 are secured to each other at a high temperature sufficient to melt the hot melt file layer to firmly bind the rug layer 17 to the strength layer. The strength layer 19 has a greater resistance to plastic elongation, such as may occur when the chair mat 13 is folded, than the yarns of the rug layer 17. As a result, the rug layer 17 is strengthened by the strength layer 19 to resist permanent stretching of the rug layer when the chair mat is folded. Moreover, the strength layer 19 rigidifies the rug layer 17 so that as the casters of the wheeled chair move over the upper surface 15 of the chair mat 13 the combined rug and strength layer resists wrinkling and bunching.

The rigid layer 21 provides a hard and smooth surface, and is harder than and more resistant to bending out of plane than the rug layer 17 and the strength layer 19 separately or as combined together by the hot melt film layer 25. In the illustrated embodiment, the rigid layer 21 includes two sheets of material 21A, 21B. The rigid layer 21 is formed by two sheets of material 21A, 21B to permit the chair mat 13 to be folded about the hinge H. It will be understood that more sheets of material (not shown) would be used when an additional hinge or hinges are desired for the chair mat. However, only one sheet of material may be used. The number of sheets of material does not need to be a function of how many hinges are to be present in the chair mat. The sheets of material 21A, 21B are made of a suitable material such as rigid virgin polyvinyl chloride (PVC). However, other materials may be used such as polycarbonate, vinyl, plywood, medium density fiberboard and high density fiberboard. The PVC sheets 21A, 21B are attached to the rug layer 17 and strength layer 19 by a pressure sensitive adhesive or gum layer 27. The pressure sensitive adhesive layer can be any suitable material such as a water based glue. In one embodiment, the PVC sheets 21A, 21B each have a thickness of about 2 mm. The rigid layer 21 (including the space between sheets 21A, 21B forming the hinge H) defines a the rolling surface of the chair mat 13 over which the wheeled chair may move with minimal resistance to rolling. The rug layer 17 covers the entirety of the rolling surface of the chair mat 13. The PVC sheets 21A, 21B have edges extending between upper and lower surfaces of the sheets. The sheets 21A, 21B are arranged edge to edge along the hinge H. Both the rug layer 17 and the strength layer 21 extend across the hinge H from one PVC sheet 21A to the other PVC sheet 21B. As integrated with the PVC sheets 21A, 21B, the rug layer 17 and in particular the strength layer 21 form the hinge H. The strength layer is selected to carry the stress and strain associated with folding about the hinge H so that the rug layer 17 will not tear or stretch prematurely because of the chair mat being folded and unfolded.

Figure 11:
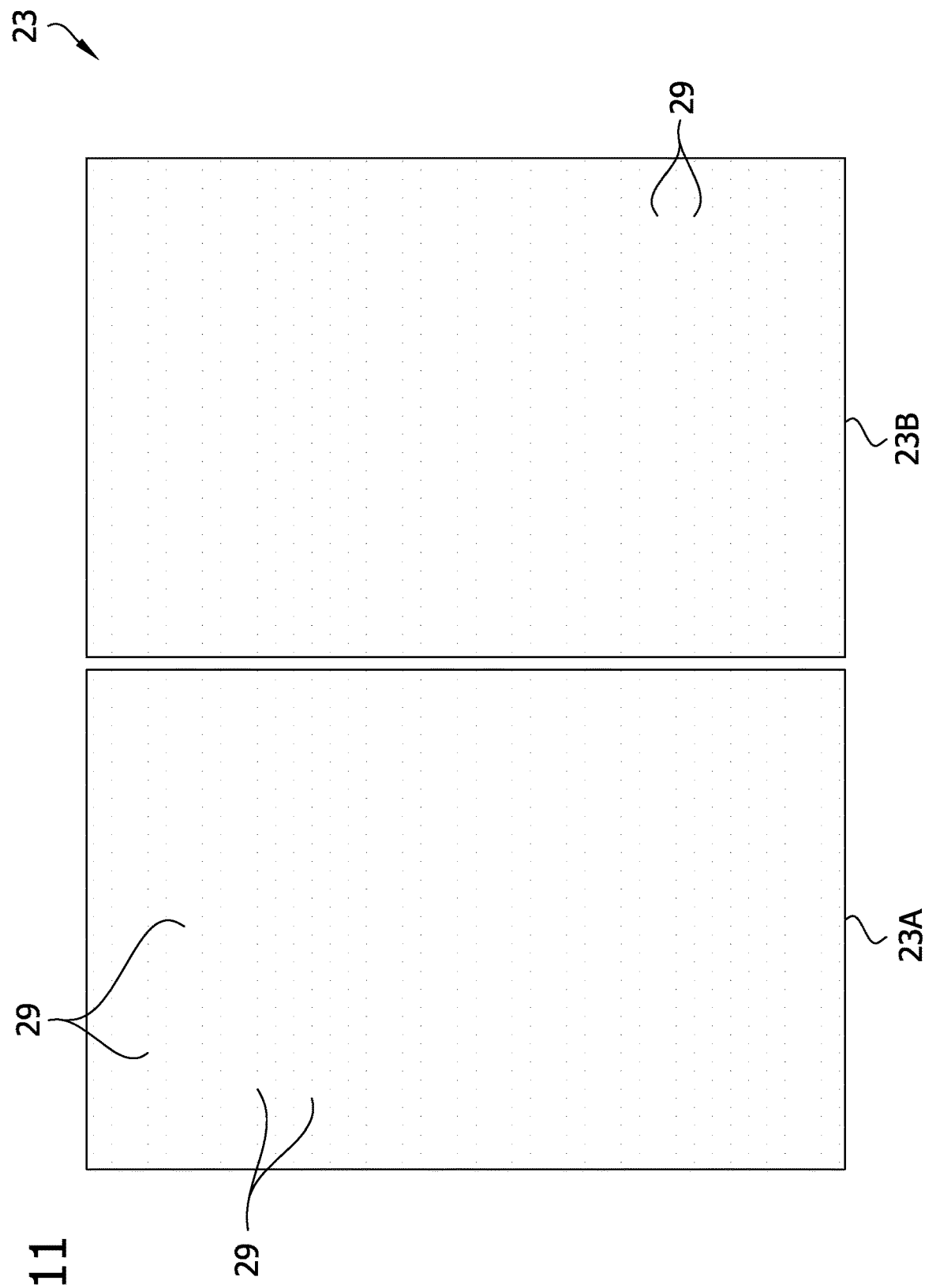
FIG. 11 is a bottom plan view of a non-skid layer of the chair mat.

The anti-skid layer 23 is configured to grip the flooring under the chair mat 13 in order to prevent the chair mat from moving with respect to the flooring. The anti-skid layer 23 is in the illustrated embodiment comprised of two sheets 23A, 23B that provide a high friction engagement with the flooring so that the chair mat 13 can grip the flooring and hold its position on the flooring as the wheeled chair rolls over the chair mat. The anti-skid layer is made of suitable material, such as 100% recycled polyester spun bonded nonwoven fabric having PVC dots 29 that provide the high friction material that grips the flooring (see, FIG. 11). The weight of the anti-skid layer 23 is about 150 g/m². The anti-skid layer pieces 23A, 23B are adhered to respective PVC sheets 21A, 21B by a pressure sensitive adhesive layer 31. The pressure sensitive adhesive layer 31 is a suitable material such as a water based glue. It will be understood that the anti-skid layer 23 and corresponding pressure sensitive adhesive layer 31 can be omitted within the scope of the present invention. For example, lower surfaces of the PVC sheets 21A, 21B can have high friction material or be formed with gripping structures (not shown).

Figure 7:
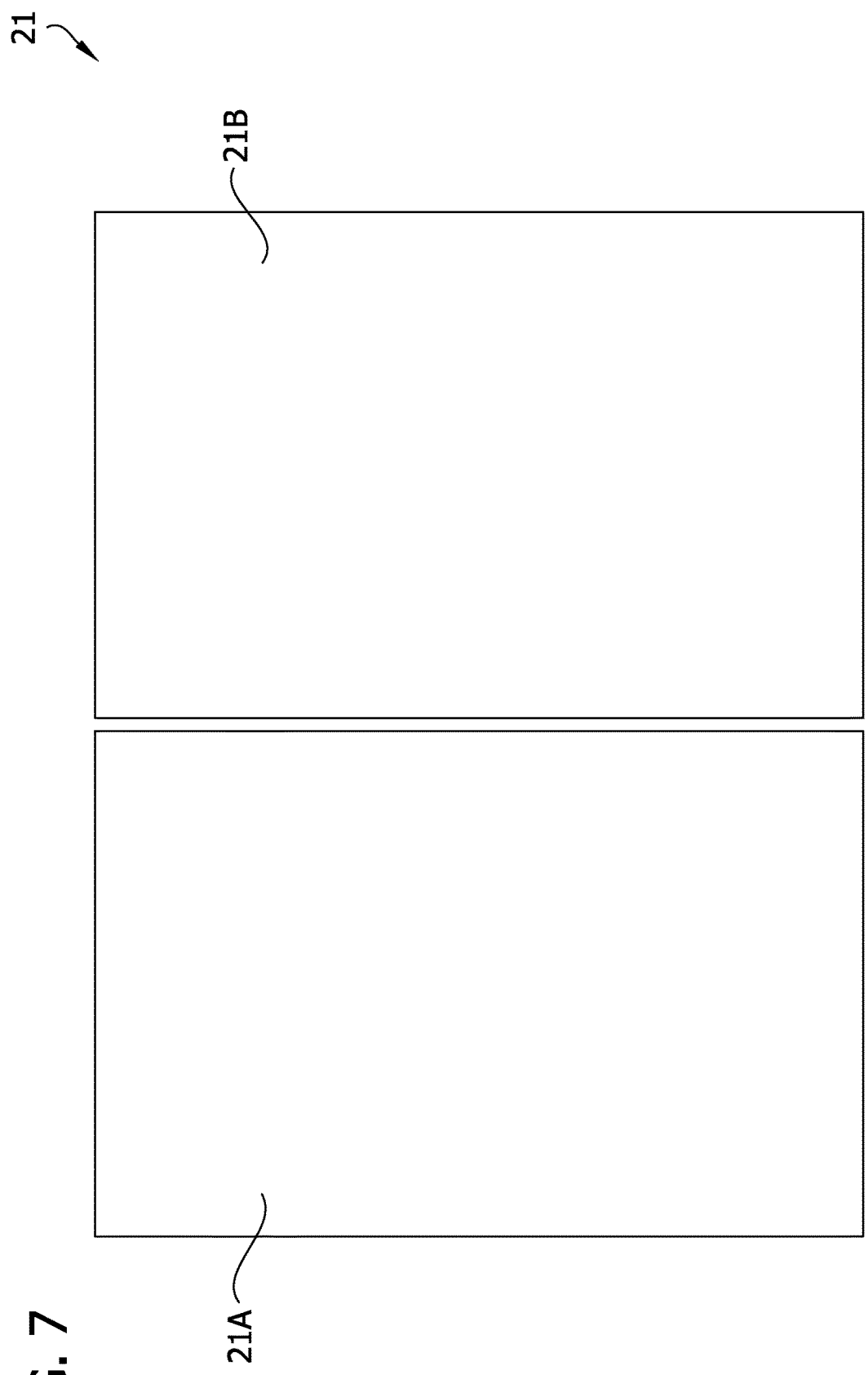
FIG. 7 is a plan view of two sheets of polyvinyl chloride material forming one of the constituent layers of the chair mat.
Figure 8:
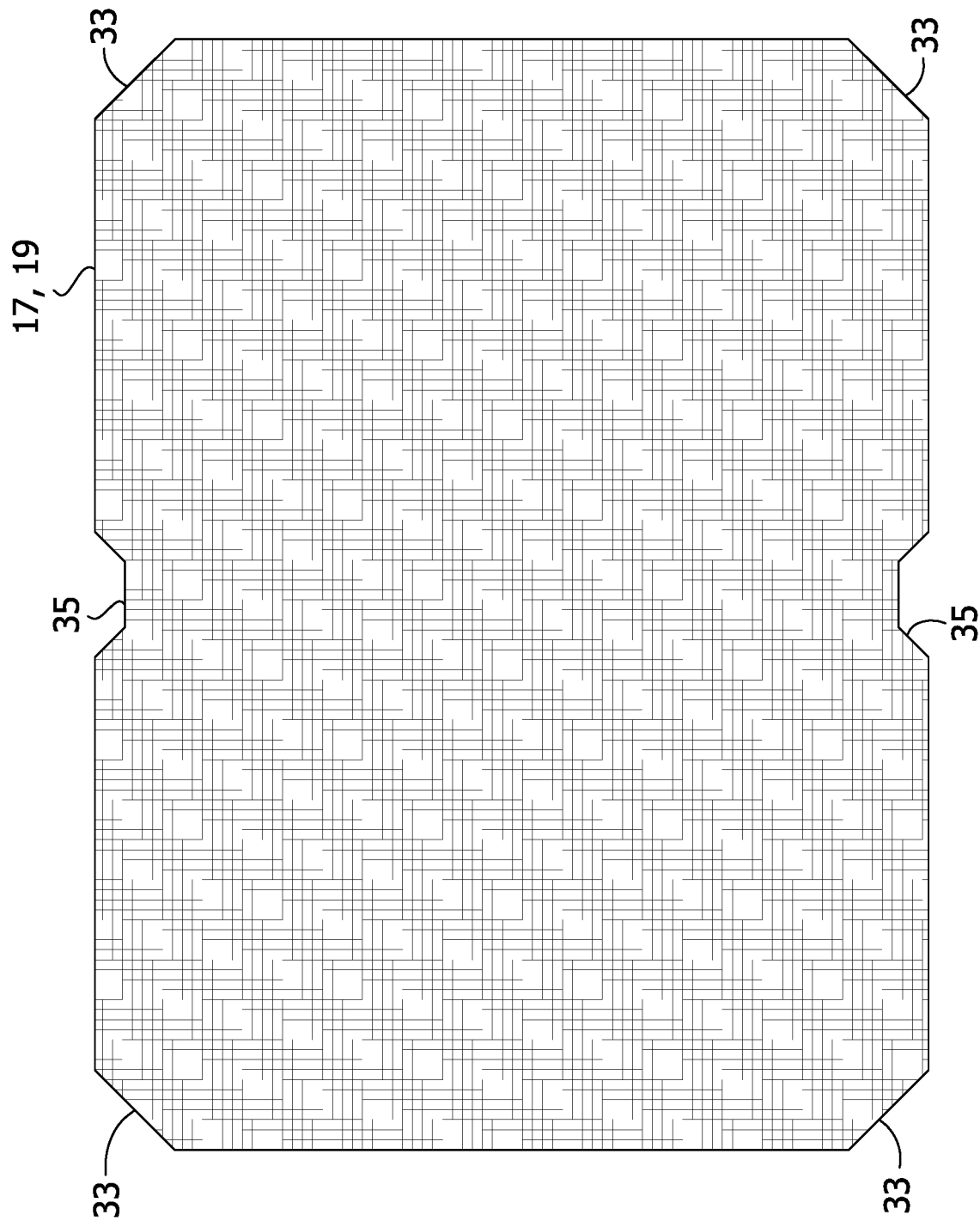
FIG. 8 is a top plan view of a rug layer of the chair mat.

Having described the construction of the chair mat 13, a method for assembling the chair mat will now be described. Depending upon the size of the chair mat 13 and the available sizes of PVC sheets, it may be necessary to first cut a unitary piece of PVC material into the two PVC sheets 21A, 21B shown in FIG. 7. Separately, the rug layer 17 is bonded to the strength layer 19 by heating the hot melt film layer 25 to a temperature that causes the material of the hot melt film to become soft. Pressure is applied to the fabric layer 17 and strength layer 19 so that they are pressed against each other and into the soft hot melt film. The material of the holt melt file 27 flows around the fibers of the rug layer 17 and the strength layer 19 to integrally bond the rug layer to the strength layer. Referring to FIG. 8, the combined fabric layer 17 and strength layer 19 are cut to shape. More specifically, the four corners 33 are cut (e.g., truncated) on a diagonal from one edge to the adjacent edge of the fabric and strength layers 17, 19, and notches 35 are cut into opposing edges of the fabric and strength layers 17, 19 that will eventually line up with the hinge H of the chair mat 13. A template (not shown) may be used to make the cuts in the combined rug and strength layers 17, 19.

Figure 9:
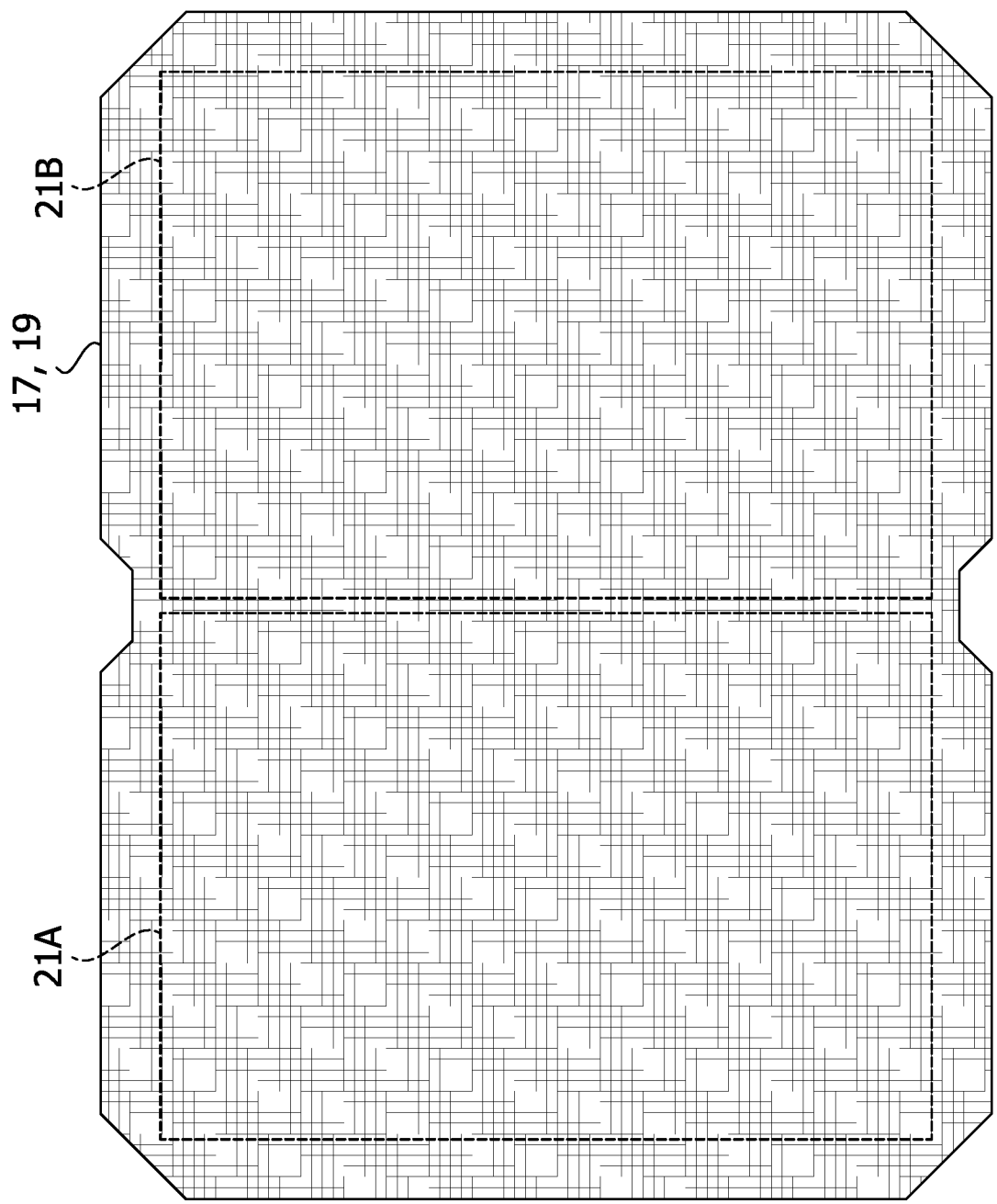
FIG. 9 is a top plan view of the rug layer laid over the polyvinyl chloride sheets.
Figure 10:
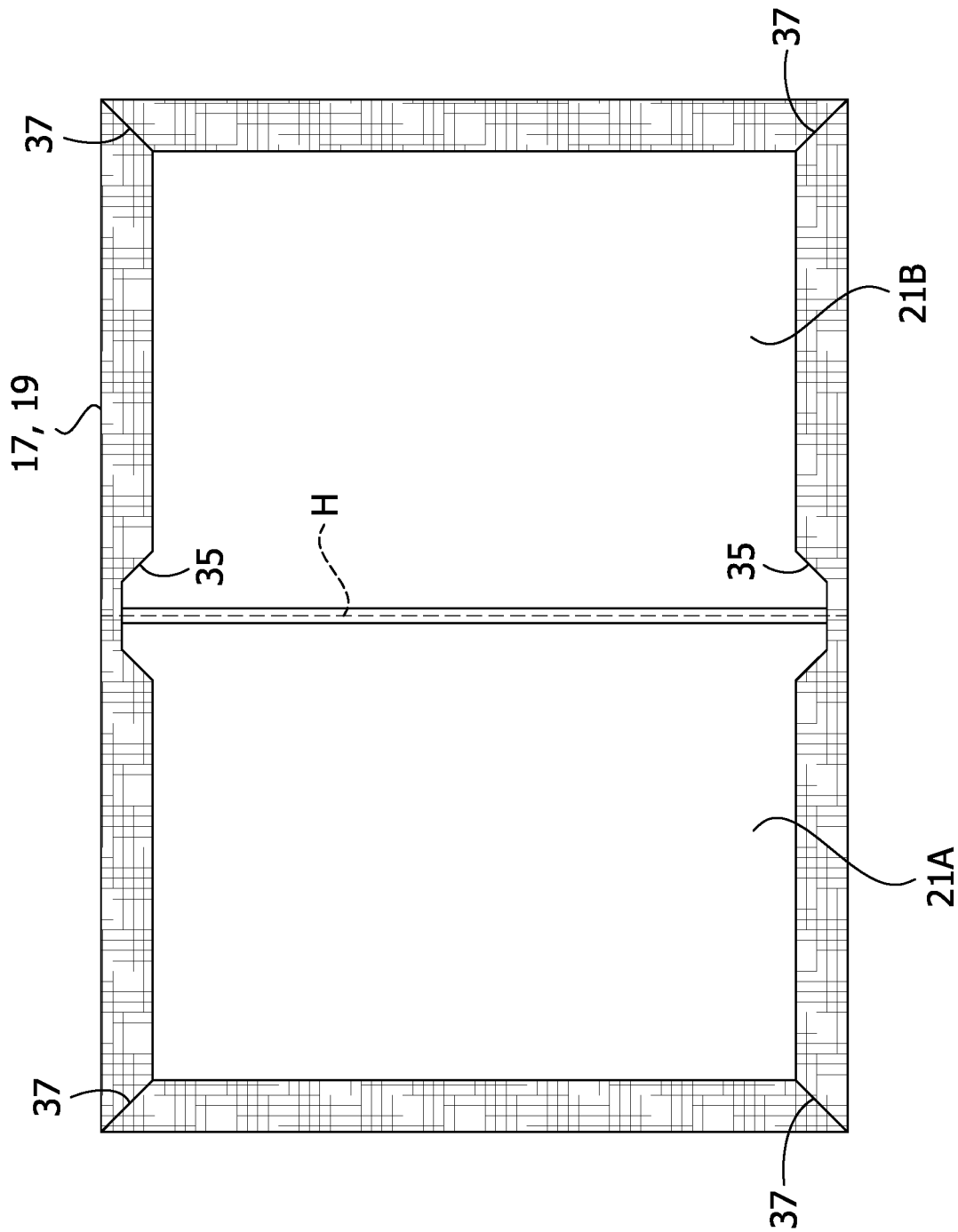
FIG. 10 is a bottom plan view of the rug layer and polyvinyl chloride sheets with edges of the rug layer folded under the polyvinyl chloride sheets.

FIG. 9 illustrates how the combined fabric and strength layers 17, 19 are then laid over the sheets 21A, 21B of PVC material, which are shown in hidden lines in FIG. 9. More specifically, the pressure sensitive adhesive layer 27 would be applied to either the bottom surface of the combined rug and strength layers 17, 19 or to the upper surfaces of the PVC sheets 21A, 21B. In one embodiment, the pressure sensitive adhesive layer 27 would be applied some time in advance of the joining of the combined rug and strength layers 17, 19 to the PVC sheets 21A, 21B. In that case, paper or other suitable covering (not shown) may be placed over the pressure sensitive adhesive layer 27 to keep it from drying out or inadvertently sticking to another surface. The rug and strength layers 17, 19 and PVC sheets 21A, 21B are pressed together at room temperature to achieve the bonding of these two constituent layers of the chair mat 13. The portions of the combined rug and strength layers 17, 19 that project beyond the peripheral edges of the rigid layer 21 can be folded under the PVC sheets 21A, 21B and bonded to the lower surfaces of the PVC sheets. The pressure sensitive adhesive layer 27 attaches the folded over portions of the combined rug and strength layers 17, 19 to the undersides of the PVC sheets 21A, 21B. It will be understood that because the corners 33 of the rug and strength layers 17, 19 have been cut, they will meet along a junction 37 on the underside of the PVC sheets 21A, 21B and not interfere with each other so that the thickness of the combined rug and strength layers 17, 19 is constant everywhere on the lower surfaces of the PVC sheets.

The final step in the assembly of the chair mat 13 is the attachment of the anti-skid layer 23 to the lower surfaces of the PVC sheets 21A, 21B and folded under portions of the rug and strength layers 17, 19. This step may be deferred until the pressure sensitive adhesive connecting the combined rug and strength layers 17, 19 to the PVC sheets 21A, 21B has dried. The pressure sensitive adhesive layer 31 is applied to either the underside of the combined rug, strength and rigid layers 17, 19, 21 to a top surface of the anti-skid layer 23. If the pressure sensitive adhesive layer 31 is applied far in advance of the joinder of the combined rug, strength and rigid layers 17, 19, 21 or to the anti-skid layer 23, paper or other suitable covering (not shown) may be applied over the pressure sensitive adhesive to prevent it from drying or becoming adhere to another surface. At the appropriate time, the paper is removed from the pressure sensitive adhesive layer 31 and the combined rug, strength and rigid layers 17, 19, 21, and the anti-skid layer 23 are pressed together at room temperature so that the pressure sensitive adhesive layer 31 bonds the combined rug, strength and rigid layers to the anti-skid layer. The assembled chair mat 13 is allowed to dry and then packaged for shipment. It will be understood that other methods of constructing the chair mat 13 may be used without departing from the scope of the present invention.

A chair mat 13 constructed according to the principles of the present invention was tested for wear and found to have excellent durability against wear due to the wheeled chair rolling across the upper surface 15. The chair mat 13 was installed on a steel platform. A wheeled office chair carrying a load of 210 pounds was placed on the chair. The wheeled chair was mechanically moved back and forth at a rate of 10 cycles per minute for a total of 20,000 cycles. The chair mat 13 and in particular the upper surface 15 of the rug layer 17 was inspected for appearance after completion of the test. No degradation in appearance of the upper surface 15 was observed. No stretching of the rug layer 17 was observed. The PVC sheets 21A, 21B were not cracked by the test regimen.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. A chair mat 13 is provided that has the appearance of an area rug while still permitting a wheeled chair to be rolled over the chair mat with a resistance to rolling that is commensurate with conventional hard plastic and wooden topped chair mats. The rug layer 17 can be woven, knitted or printed with any design that could be provided on an ordinary rug. The combination of the rug layer 17 with the strength layer 19 and rigid layer 21 is durable as well as functional. The construction of the chair mat 13 permits it to be folded and unfolded along the hinges H without damage to the rug layer 17 that would affect the appearance or operability of the rug layer to allow smooth rolling of the wheeled chair over the upper surface 15.

As various changes could be made in the above products and methods without departing from the scope of the invention, it is intended that all matter contained in the above description shall be interpreted as illustrative and not in a limiting sense.

What is claimed is:

1. A chair mat providing a rolling surface for a wheeled chair comprising:
   a rigid layer having an upper surface and a lower surface and including at least two rigid layer members arranged for folding one onto the other about a hinge;
   a strength layer attached to the rigid layer and covering the upper surface of the rigid layer to hold the rigid layer members together for folding about the hinge;
   a fabric floor covering fixedly attached to the strength layer;
   wherein the fabric floor covering is adhered to the strength layer and the strength layer is adhered to the rigid layer, the adherence of the fabric floor covering to the strength layer and adherence of the strength layer to the rigid layer rigidifying the fabric floor covering so that as casters of a wheeled chair move over an upper surface of the fabric floor covering, the combined fabric floor covering and strength layer resists wrinkling and bunching.

2. The chair mat as set forth in claim 1 wherein the upper surface of the rigid layer defines a rolling surface over which the wheeled chair may move, wherein the fabric floor covering covers the entirety of the rolling surface.

3. The chair mat as set forth in claim 1 wherein the rigid layer members have edges extending between upper and lower surfaces, the rigid layer members being arranged edge to edge along the hinge, the strength material extending across the hinge from one of the rigid layer members to the other of the rigid layer members.

4. The chair mat as set forth in claim 3 wherein the fabric floor covering extends across the hinge from one of the rigid layer members to the other of the rigid layer members.

5. The chair mat as set forth in claim 1 further comprising an anti-skid layer including a top surface fixedly attached to the lower surface of the rigid layer.

6. The chair mat as set forth in claim 5 wherein the anti-skid layer comprises a nonwoven fabric with dots of high friction material spaced over a bottom surface of the nonwoven fabric.

7. The chair mat as set forth in claim 5 wherein the fabric floor covering overlies the strength layer, the strength layer overlies the rigid layer and the rigid layer overlies the anti-skid layer.

8. The chair mat as set forth in claim 7 wherein the fabric floor covering is adhered to the strength layer and the strength layer are adhered to the rigid layer, the strength layer being everywhere interposed between the fabric floor covering and the upper surface of the rigid layer.

9. The chair mat as set forth in claim 8 wherein the fabric floor covering and strength layer are adhered to each other separate from the adherence to the rigid layer.

10. The chair mat as set forth in claim 9 wherein the anti-skid layer is adhered to the rigid layer.

11. The chair mat as set forth in claim 1 wherein the rigid layer has a greater resistance to bending than the strength layer and the fabric floor covering.

12. The chair mat as set forth in claim 11 wherein the rigid layer is formed from a material selected form the group including a polymer and wood.

13. The chair mat as set forth in claim 12 wherein the polymer comprises a material selected form the group including polyvinyl chloride, polycarbonate and vinyl.

14. The chair mat as set forth in claim 13 wherein the wood comprises a material selected from a group including naturally occurring wood, medium density fiberboard, high density fiberboard and plywood.

15. The chair mat as set forth in claim 1 wherein the fabric floor covering covers the upper surface of the rigid layer and wraps around edges of the rigid layer.

16. The chair mat as set forth in claim 15 wherein the fabric floor covering includes notches on opposite edges thereof, the notches being aligned with the hinge.

17. The chair mat as set forth in claim 16 wherein the fabric floor covering has corners which are truncated, and the rigid layer has corners of a different shape than the corners of the fabric floor covering.

18. The chair mat as set forth in claim 1 wherein the fabric covering is a woven or knitted structure free of any pile or nap.

19. The chair mat as set forth in claim 18 wherein the fabric is a jacquard woven fabric that is a mix of polyester and acrylic.

20. The chair mat as set forth in claim 1 wherein the fabric floor covering has adhesive everywhere interposed between the fabric floor covering and the strength layer.

21. The chair mat as set forth in claim 1 wherein, the strength layer is everywhere interposed between the fabric floor covering and the upper surface of the rigid layer.

22. The chair mat as set forth in claim 1 wherein the rigid layer and fabric floor covering layer have a fold configured to fold the chair mat to bring lower surfaces of the rigid members toward each other so that in a folded condition the lower surfaces are closer to each other than upper surfaces of the rigid layer members.

23. The chair mat as set forth in claim 1 wherein the first and second rigid layer members define an outer perimeter, the first and second rigid layer members being collectively sized and shaped to permit the wheeled chair to roll over the upper surface of the rigid layer within the outer perimeter.

24. A chair mat providing a rolling surface for a wheeled chair comprising:
- a rug layer formed by one of weaving and knitting and being free of a pile or nap, the rug layer having a bottom surface;
- a strength layer intimately bonded to the rug layer to form a combined rug and strength layer, the strength layer having a greater resistance to plastic deformation than the rug layer;
- a rigid layer attached to the combined rug and strength layer, the rigid layer having an upper surface, the rigid layer being harder than the rug layer and the strength layer and having a greater resistance to bending than the rug layer and the strength layer;
- wherein the combined rug and strength layer is adhered to the rigid layer, the combined rug and strength layer adhered to the rigid layer rigidifying the rug layer so that as casters of a wheeled chair move over an upper surface of the rug layer the combined rug and strength layer resists wrinkling and bunching.

\* \* \* \* \*